United States Patent

[11] 3,559,932

[72] Inventor Mathais N. Ternes
El Centro, Calif.
[21] Appl. No. 801,056
[22] Filed Feb. 20, 1969
[45] Patented Feb. 2, 1971
[73] Assignee The United States of America as represented by the Secretary of the Navy

[54] INTEGRATED PARACHUTE HARNESS FOR SUPPORTING A RESERVE PARACHUTE SYSTEM
6 Claims, 4 Drawing Figs.
[52] U.S. Cl. .................................................. 244/151
[51] Int. Cl. ...................................................... B64d 17/30
[50] Field of Search........................................... 244/151, 143, 142

[56] References Cited
UNITED STATES PATENTS
| | | | |
|---|---|---|---|
| 2,475,631 | 7/1949 | Miller et al. | 244/151 |
| 2,527,972 | 10/1950 | Tauty | 244/151 |
| 3,154,272 | 10/1964 | Gold | 244/151 |
| 3,258,231 | 6/1966 | Basnett | 244/151 |
| 3,380,692 | 4/1968 | Gaylord | 244/151 |

Primary Examiner—Milton Buchler
Assistant Examiner—James E. Pittenger
Attorneys—J. C. Warfield, Jr. and George J. Rubens ABSTRACT: A parachute harness which has an integral arrangement of webbing straps including a quick releasable means to support the wearer to a main parachute pack and also including quickly detachable means to secure a reserve parachute pack.

PATENTED FEB 2 1971

III-III

IV-IV

INVENTOR.
MATHAIS N. TERNES
BY

George J. Rubens

ATTORNEYS

INTEGRATED PARACHUTE HARNESS FOR SUPPORTING A RESERVE PARACHUTE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although it is recognized that the present invention may have various uses, the use for which it is particularly intended is in an integrated parachute system wherein the parachute assembly normally remains in the aircraft being connected to an ejection seat and is attached to the harness worn by the user when he straps himself in the aircraft.

Integrated parachute systems have been employed as the primary escape system for high performance military aircraft since the advent of ejection seats. These systems in addition to providing for the main parachute system also include a plurality of subsystems, such as floration, survival, and locater aids, which are attached to the parachute harness in various ways. During the testing procedures for new parachute designs an additional reserve parachute subsystem is necessary which is not normally included in the design of a basic parachute system.

To accommodate the reserve parachute system it was necessary at the test facility to use another harness in addition to the main parachute harness. The use of two separate harnesses, one for the main parachute to be tested, and another harness for the reserve parachute made the sling equipment bulky, cumbersome and created uneven seat surfaces for the jumper. In addition, the use of two harnesses produced various pressure areas on the body of the jumper which induce discomfort and fatigue and had a debilitory effect on the test jumper's performance, endurance, and overall effectiveness of the test mission. The additional webbing and fittings also presented a safety problem during water landings or landings in high wind conditions that required extra manipulative efforts and necessitated special training for the test jumpers.

SUMMARY OF THE INVENTION

The parachute harness of the present invention provides a single integrated arrangement of webbing and fittings for attachment of both a main parachute pack and the attachment of a reserve parachute pack should one be necessary for any reason, such as during test drops. The harness comprises essentially two interconnected strap systems, a primary strap system for supporting the legs, lap and sides of the user and a secondary strap system that restrains the shoulders and back of the user. The primary strap system can be a continuous single strap that is anchored to both the main parachute detachable connecting means and the reserve parachute detachable connecting means. The secondary strap system is also a single strap that extends around the shoulders and back of the user and is secured at its ends to the main strap system by the same special keepers that secure the main strap system to the respective parachute connecting means. Adapter fittings slidably interconnect the primary and secondary strap systems at the back portion of the harness whereby tightening of the primary strap system tightens the secondary strap system around the shoulders through the adapter fittings. The primary strap system is provided with a lap restraint strap with a loop fitting at each end for attachment of the lap restraint webbing and a survival kit. The novel parachute harness can be integrally incorporated in a conventional torso suit in which suitable openings can be provided to permit the main and reserve parachute connecting means to protrude freely for attachment of the respective parachute packs.

STATEMENT OF OBJECTS OF INVENTION

A principal object of the invention is to provide a single parachute harness which is capable of supporting both a main parachute pack and a reserve parachute pack, eliminating the need for a separate harness for each parachute system.

A corollary object is to provide such a composite parachute harness that is simple in construction, having a reduced number of parts, that reduces to a minimum any discomfort to the wearer and simplifies preparation time.

Another important object is to provide a parachute harness which is capable of being incorporated in an integrated parachute system.

Still another important object is to reduce the weight and bulk of a parachute harness thereby reducing pressure points on the body of the user and the fatigue element associated with flying and testing parachutes to enhance test results.

Other objects, advantages and novel features of the invention will become apparent from the following detailed description of the invention when considered in conjunction with the accompanying drawings wherein.

Figure 1:
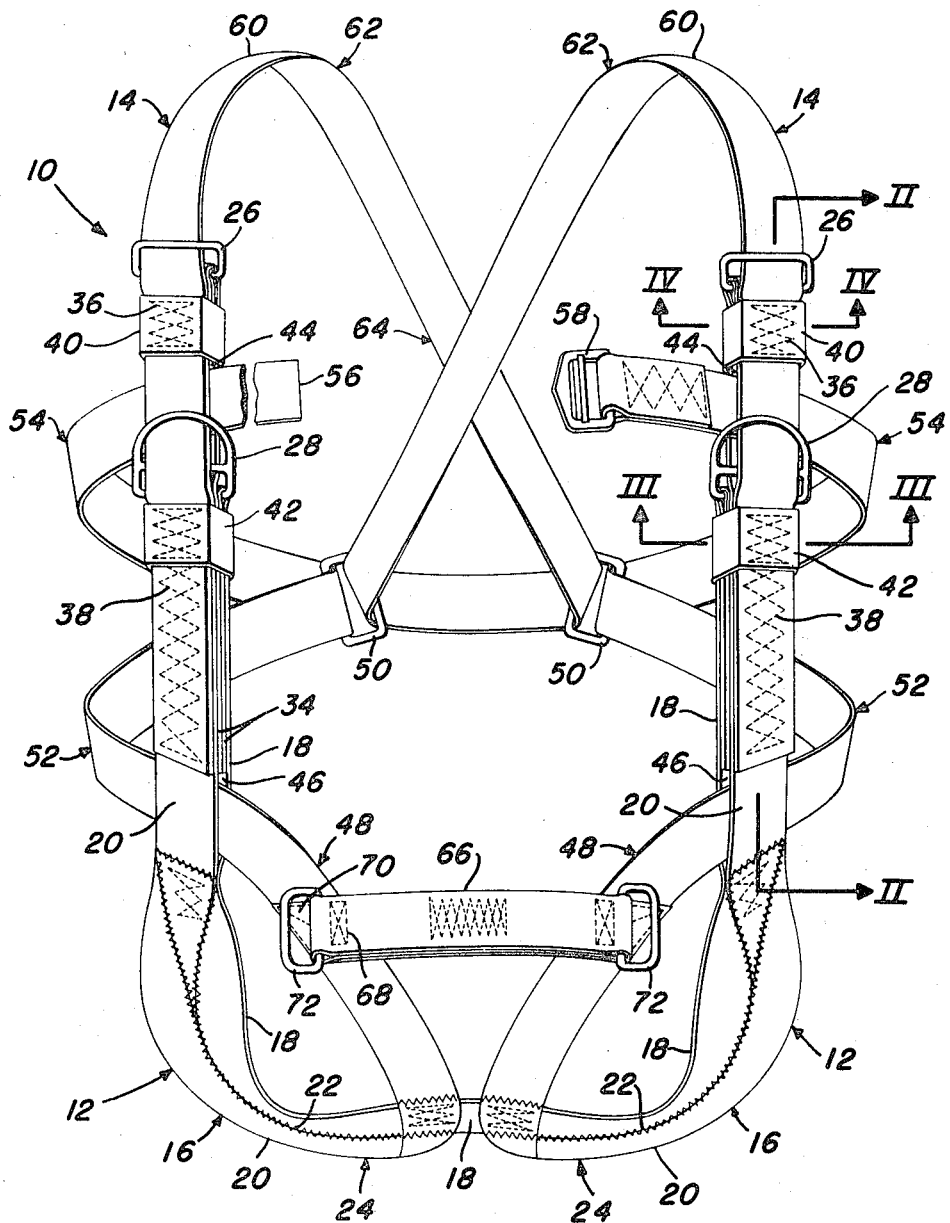
FIG. 1 shows a front elevation view of the novel parachute harness with the multilayered portions of webbing shown in perspective and the chest strap in an unfastened position.

Referring to the drawings where like reference numerals refer to similar parts throughout the FIGS. there is shown in FIG. 1 a parachute harness 10 that is particularly suited for use in an integrated parachute system, although the torso suit with which the parachute harness is normally associated is not illustrated. Harness 10 essentially comprises two interconnected strap system fabricated of conventional webbing material, namely, a primary strap suspension system 12 which supports the lower portion of the user's body and a secondary strap system 14 which supports the shoulder and back portions of the user.

Primary strap system 12 consists of a single continuous main strap 16 that zigzags around through the harness, from one longitudinal side to the other in a manner presently to be described. Commencing from the longitudinal centerline of the harness only the left side of the illustrated harness need to be described as the two dies sides are mirror images, one minor difference will be noted.

Figure 2:
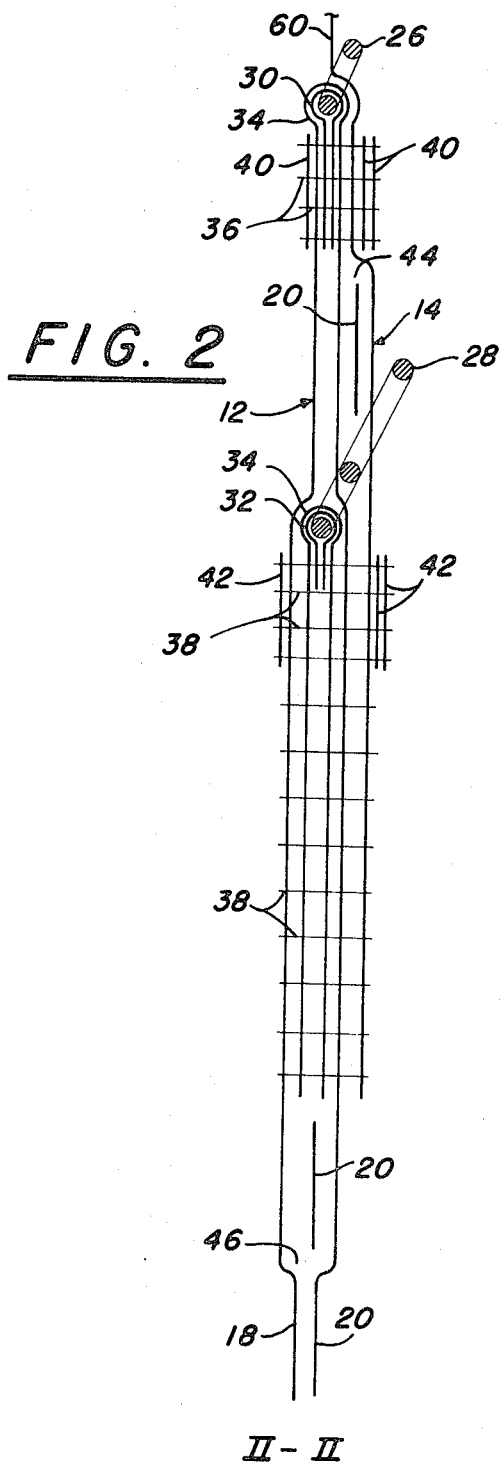
FIG. 2 shows a diagrammatic longitudinal section taken along line II–II of FIG. 1 with the webbing layers slightly exploded to show their arrangement.
Figure 3:
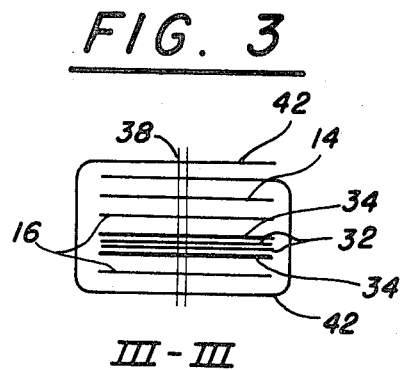
FIGS. 3 and 4 show diagrammatic cross-sectional views taken along lines III–III and IV–IV, respectively, of the side strap of the parachute of FIG. 1.
Figure 4:
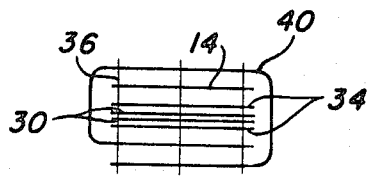

Main sling strap 16 includes an upwardly and downwardly extending leg or riser portions 18 and 20, respectively, having lateral ends sewn together at 22 at their lower portion to form a double width seat sling 24 for comfortable supporting of the jumper. As best shown in FIG. 2 the upper portions of legs 18 and 20 form side straps of the parachute being continuously looped around the link 26 for connecting and quick release of a main parachute pack and snubbed around an intermediately positioned D-ring 28 for the quick attachment of a reserve parachute pack, neither parachute packs being illustrated. D-rings 28 are preferably located at the right and left subclavicular portion of the jumper's body. Chaffing webbing 30 and 32 are wrapped around link 26 and D-ring 28, respectively, to minimize wear on sling strap, and a reinforcement strap 34 interposed between leg portions 18 and 20 of the main sling and chaffing webbing 32 of D-ring 28. Chaffing webbing 30 serves also as a reinforcement strap for link 26. Each assembly of superimposed straps are sewn together at 36 and 38 and are snubbed together adjacent link 26 and D-ring 28 by keeper straps 40 and 42, respectively, which are wrapped around and sewn to the strap assemblies (see FIGS. 3 and 4). Portions of the side straps are left unsewn to provide channels 44 and 46 slidably to receive the other end of the main strap in a manner presently to be described.

Leg 18 of main sling strap continues down and around, being part of the seat 24, to the right side of the parachute harness and upwardly and around in a duplicate path to that described. The lower portion of main strap leg 20 projects upwardly and forwardly to form a leg strap loop 48 and then freely passes through channel 46 between side straps. In a zigzag pattern, leg 20 continues upward forming a hip restraining loop 52 and is then reeved through a corresponding back adapter fitting 50 which reverses its direction and is threaded through slot 44 to form a chest restraining loop 54 finally terminating in strap end 56. Strap end 56 is adapted to be connected to a buckle 58 which terminates that end of strap 16 which extends on the right side of harness 10, the ends of the straps being the only differences between the two sides of the harness. The combination of the hip restraining loop 52 and chest restraining loop 54 may be called collectively a torso restraining portion of the sling.

The secondary strap system 14 comprises a relatively short length strap 60 which is threadedly attached to the primary strap system 12 by sewing 38 and keeper straps 40 and 42. Strap 60 extends upwardly from the points of attachment and crosses itself from right and left sides of the harness to form shoulder-restraining loops 62 being threaded through back adapter fittings 50 to form a back-supporting strap portion 64.

A lap restraint strap 66 is sewn at 68 to a supporting strap 70 secured to both leg strap loops 48. Strap 66 terminates at both ends in links 72 by which is attached the lap belt restraint system of the parachute and the survival kit (not shown) normally used in high performance aircraft.

The novel invention provides a single integrated parachute harness which is simplified and lighter in weight and accommodates both a main parachute, such as one to be tested, and a reserve parachute for emergency use should the test parachute fail. The novel arrangement of strap webbing and fittings eliminates bulk and uneven surfaces at the seat sling and at other pressure points and provides a more comfortable fitting suit that reduces discomfort and fatigue to the wearer. In addition to the above advantages, elimination of a separate harness for the reserve parachute reduces the number of parachute harness systems that need be maintained by the testing activity, thereby reducing monetary investment as well as simplifying preflight inspection and training.

Obviously many modifications and variations of the present invention are possible in the light of the above teachings. It is therefore to be understood that within the scope of the concept of the present invention, the invention may be practiced otherwise than as specifically described.

I claim:

1. A parachute harness comprising:
   a suspension sling section for supporting the user including a pair of side straps;
   a shoulder strap section secured to said side straps;
   a pair of fasteners longitudinally positioned in spaced relation on each side strap for connection to a main parachute and a reserve parachute respectively;
   each of side straps having a looped portion secured through said respective fasteners with two downwardly extending leg portions;
   an end of one leg portion being looped upwardly to form a lap restraining portion and a torso restraining portion;
   the end of the other leg portion extending transversely the sling to be integral with the corresponding leg portion of the other side strap;
   whereby the sling portion including the side straps, the lap restraining portions, and the torso restraining portions are fabricated of a single, continuous length of strap.

2. The parachute harness of claim 1 wherein said lap restraining portions are connected together by a strap secured therebetween having connector rings for the attachment of accessory equipment.

3. The parachute of claim 1 wherein intermediate areas of said leg portions are secured together in juxtaposition to form a seat portion in the sling of double strap width.

4. The parachute of claim 1 wherein the ends of the shoulder strap section are threaded through the respective fasteners on each side strap and are secured thereto.

5. The parachute of claim 4 wherein each torso restraining strap portion is loosely connected to the shoulder strap section by a ring to permit relative adjustment.

6. In a parachute harness having a suspension sling section and a shoulder strap section, said suspension sling section including:
   a pair of identical side straps, one for each side of the sling;
   each side strap having a looped portion with two downwardly extending leg portions;
   intermediate areas of said leg portions being secured together in juxtaposition to form a seat portion of double strap width;
   an end of one leg being looped upwardly to form a lap restraining section;
   the end of the other leg extending transversely the harness to the other side strap to be integral with the corresponding leg strap;
   whereby the suspension sling section is fabricated of a single, continuous length of strap.